UNITED STATES PATENT OFFICE.

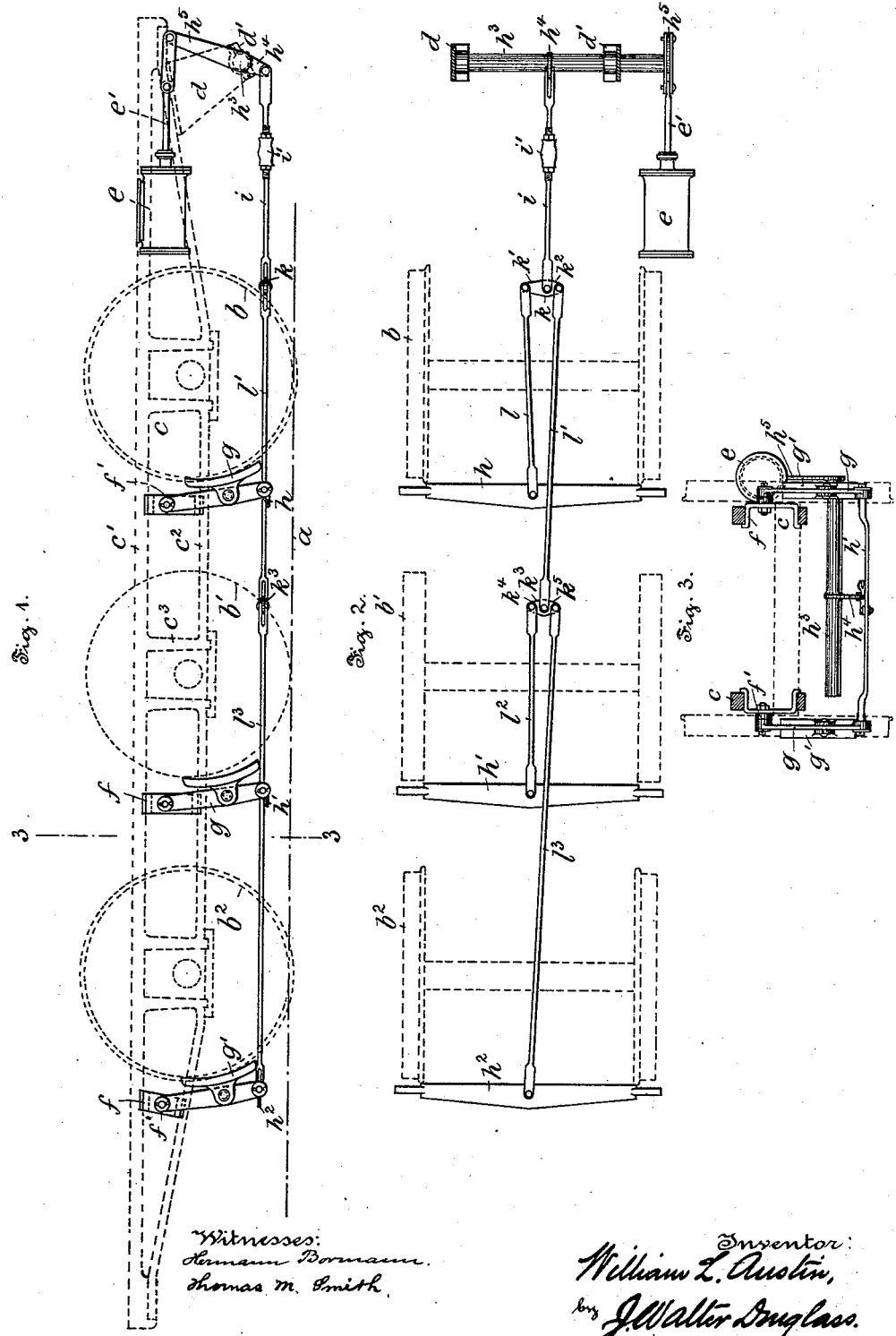

WILLIAM L. AUSTIN, OF PHILADELPHIA, PENNSYLVANIA.

LOCOMOTIVE-DRIVER BRAKE.

SPECIFICATION forming part of Letters Patent No. 450,212, dated April 14, 1891.

Application filed January 17, 1891. Serial No. 378,068. (No model.)

*To all whom it may concern:*

Be it known that I, WILLIAM L. AUSTIN, a citizen of the United States, residing at the city of Philadelphia, in the county of Philadelphia and State of Pennsylvania, have invented certain new and useful Improvements in Locomotive-Driver Brakes and Mechanism therefor, of which the following is a specification.

My invention relates, in general, to mechanism for transmitting motion from a brake-cylinder or other source of power to the brake blocks or shoes of vehicles; but it particularly relates to certain improvements in the construction and arrangement of brake work or mechanism for actuating the brake blocks or shoes of the driving-wheels of locomotives.

The principal objects of my present invention are, first, to provide compact, simple, and efficient means for applying the force of pressure exerted by a steam, air, vacuum, or other power-cylinder of a locomotive to mechanism adapted to apply and equalize the pressure upon all the driving-wheel brake blocks or shoes, and, second, to provide means for attaching the equalizing mechanism and brake-levers to the frame-work of the locomotive, so that the line of stress falls within the frame itself.

My invention consists in brake mechanism for locomotives, comprising frame-work, a cranked rock-shaft provided with an operating-arm and held by brake-supports depending from the frame-work, a brake-rod attached to said crank, a draft-equalizer pivotally attached to said brake-rod and provided with links and rods, the said links being connected with brake beams or carriers supported by levers provided with brake shoes or blocks and suspended from said frame-work, and said rods being pivoted to other draft-equalizers connected by links to other brake beams or carriers, a steam, air, vacuum, or other power cylinder, and suitable connections between said cylinder and operating-arm.

The nature and characteristic features of my invention will be more fully understood from the following description, taken in connection with the accompanying drawings, forming part hereof, in which—

Figure 1 is a side elevation of brake mechanism embodying features of my invention, and showing in dotted lines the drivers and a portion of the frame-work of a locomotive, and also showing the location of an air, steam, vacuum, or other power cylinder. Fig. 2 is a top or plan view of the brake-work illustrated in Fig. 1, having the brake blocks or shoes and the frame-work removed, and showing the location of the air, steam, vacuum, or other power cylinder. Fig. 3 is a transverse section on the line 3 3, looking toward the right hand in Fig. 1, showing a centrally-cranked shaft, provided at or near one extremity thereof with an operating-arm and supported in brake-supports depending from the frame, also showing a brake beam or carrier located below the plane of the driving-wheel axles and supported by levers pivotally attached to bridge-pieces attached to the frame-work.

In the accompanying drawings, $a$ represents the top of a rail.

$b$, $b'$, and $b^2$ represent three pairs of driving-wheels.

The stringers $c'$, tie-bars $c^2$, and struts $c^3$ constitute the frame-work $c$ of a locomotive.

$d$ are brake-supports, provided with journal boxes or bearings $d'$ and attached to the under side of the frame $c$ behind the rear pair of drivers $b$.

$e$ is a brake-cylinder attached to the frame $c$ and located either outside and in rear of the driver $b$, as shown in Fig. 2, so that a cylinder (not shown) for actuating the brakes of the tender may be placed upon the opposite and corresponding side of the frame, thus leaving as much space as possible for the fire-box and other parts of the locomotive, or the cylinder $e$ may be located inside the frame-work and disposed either horizontally or vertically, according to the type of locomotive to which the same may be applied.

$e'$ is a piston-rod engaging with the cylinder $e$ in the usual manner.

$f$ are bridge-pieces provided with journals $f'$ and attached to the frame-work $c$, as will be readily understood by reference to Fig. 3.

$g$ are levers pivotally supported by the journals $f'$ and provided at or near their respective centers with brake shoes or blocks $g'$.

$h$, $h'$, and $h^2$ are brake-beams or carriers pivotally attached at or near the respective extremities thereof to the levers $g$.

$h^3$ is a rock-shaft, supported in the bearings $d$ and provided at or near the center with a crank $h^4$ and at or near one extremity with an operating-arm $h^5$.

$h^6$ is a link pivotally attached at the respective extremities to the piston-rod $e'$ and the operating-arm $h^5$.

$i$ is a brake-rod, provided with a turnbuckle $i'$ for adjusting the length thereof and pivotally attached at one extremity to the centrally-located crank $h^4$ and at the other extremity to a draft-equalizer $k$. This draft-equalizer consists of a bar having two arms of equal or unequal length, for a purpose to be hereinafter explained. In the present instance the arms are of unequal length, the arm $k'$ being twice as long as the arm $k^2$.

$l$ is a link pivotally connected at its respective extremities to the arm $k'$ and to the center of the brake beam or carrier $h$.

$l'$ is a rod pivotally connected at its respective extremities to the arm $k^2$ of the equalizer $k$, and to a second equalizer $k^3$, having equal arms $k^4$ and $k^5$.

$l^2$ and $l^3$ are links pivotally attached at their respective extremities to the central portions of the brake beams or carriers $h'$ and $h^2$.

The arms of the draft-equalizers are made of unequal length, as indicated at $k$, whenever it is desired to transmit unequally the force exerted upon the brake-rod $i$ to the link $l$ and rod $l'$, and the arms of the draft-equalizers are made of equal lengths, as indicated at $k^3$, whenever it is desired to transmit equally the force exerted upon the rod $l'$ to the links $l^2$ and $l^3$. In the present instance the force exerted upon the rod $i$ will be divided into thirds, one-third being transmitted by the link $l$ to the brake beam or carrier $h$, and the other two-thirds transmitted by the rod $l'$ to the draft-equalizer $k^3$. The arms of the draft-equalizer $k^3$ are of equal length, and consequently divide the force exerted upon the rod $l'$ into two equal parts, of which one is transmitted by the link $l^2$ to the brake beam or carrier $h'$, and the other is transmitted by the link $l^3$ to the brake beam or carrier $h^2$, so that one-third of the force applied to the brake-rod $i$ is transmitted to each of the brake beams or carriers $h$, $h'$, and $h^2$.

Although the invention has been described with relation to a six-wheel locomotive, still it is applicable to other types of locomotives, because the pull exerted by the brake-rod $i$ may be applied equally to any number of pairs of driving-wheels by employing draft-equalizers having arms of either equal or unequal length, which will be readily understood.

In use the brake shoes or blocks are applied to or withdrawn from the peripheries of the driving-wheels $b$, $b'$, and $b^2$ by means of the brake-cylinder $e$ or other source of power, and in the following manner: The motion of the piston-rod $e'$ is transmitted to the brake-rod $i$ by means of the operating-arm $h^5$, crank $h^4$, and rock-shaft $h^3$, and the force exerted by the brake-rod $i$ is transmitted by means of the rods $l'$, links $l$, $l^2$, and $l^3$, and draft-equalizers $k$ and $k^3$ to the brake beams or carriers $h$, $h'$, and $h^2$. These latter in turn transmit force to the brake shoes or blocks $g'$ by means of the levers $g$, pivotally attached to the journals $f'$, supported by the main frame $c$. The employment of the rock-shaft $h^3$, suspended beneath the main frame, permits the cylinder $e$ to be located outside of the main frame, so as to economize in space, while at the same time the brake-rod $i$ is centrally located, and the bridge-pieces $f$, provided with journals $f'$, in connection with the levers $g$, not only permit of the application of pressure to the lower portion of the wheels, but also distribute the strain evenly throughout the frame $c$.

Having thus described the nature and objects of my invention, what I claim as new, and desire to secure by Letters Patent, is—

1. The combination, with the main frame of a locomotive and bridge-pieces thereof, of brake-levers provided at or near their respective centers with brake shoes or blocks and pivotally attached at their upper extremities to said bridge-pieces, brake-beams pivoted to said levers and provided with links, a cranked rock-shaft provided at one extremity with an operating-arm and held in rigid supports depending from said frame, a series of rods and draft-equalizers operated by said crank-shaft, each equalizer being pivoted to a brake-beam link, a brake-cylinder attached to said frame, and suitable connections between said cylinder and operating-arm, substantially as described.

2. In a brake system, a centrally-cranked rock-shaft held in brake-supports rigidly attached to the under side of the main frame and provided at or near one extremity with an operating-arm, in combination with a brake-rod attached to said crank, a brake-cylinder attached to and located outside of said main frame, and suitable connections between said cylinder and operating-arm, substantially as described.

3. In a brake system, a centrally-cranked rock-shaft supported in brake-supports rigidly attached to the under side of the main frame and provided at or near one extremity thereof with an operating-arm, in combination with a brake-rod attached to said crank, a brake-cylinder attached to and located outside of said main frame, a piston-rod, and a link attached to said piston-rod and operating-arm, substantially as described.

4. In a brake system, the combination, with the main frame of a locomotive and braces and bridge-pieces thereof, of brake-levers provided at or near their respective centers with brake shoes or blocks and pivotally attached at their upper extremities to said braces and bridge-pieces, brake-beams pivoted to said brake-levers, a centrally-cranked rock-shaft provided at one extremity with an operating-arm and held in brake-supports depending from said frame, a series of rods, links, and draft-equalizers operated by said crank-shaft and connected to said brake-beams, a brake-cylinder attached to said frame, and suitable connections between said cylinder and operating-arm, substantially as described.

In witness whereof I have hereunto set my signature in the presence of two subscribing witnesses.

WM. L. AUSTIN.

Witnesses:
HERMANN BORMANN,
THOMAS M. SMITH.